United States Patent
Lokhandwala

[11] Patent Number: 6,161,386
[45] Date of Patent: Dec. 19, 2000

[54] POWER GENERATION METHOD INCLUDING MEMBRANE SEPARATION

[75] Inventor: Kaaeid A. Lokhandwala, Union City, Calif.

[73] Assignee: Membrane Technology and Research, Inc., Menlo Park, Calif.

[21] Appl. No.: 09/220,971

[22] Filed: Dec. 23, 1998

[51] Int. Cl.[7] ................................................. F01K 25/06
[52] U.S. Cl. .................... 60/649; 60/651; 60/671; 95/50; 95/96; 95/143; 95/144; 95/237; 95/240
[58] Field of Search ............................ 60/649, 651, 671, 60/679; 55/16, 23, 31, 33, 68, 158; 95/39, 95, 48, 50, 54

[56] References Cited

U.S. PATENT DOCUMENTS

| | | | |
|---|---|---|---|
| 4,370,150 | 1/1983 | Fenstermaker | 55/16 |
| 4,685,940 | 8/1987 | Soffer et al. | 55/158 |
| 4,857,078 | 8/1989 | Watler | 55/16 |
| 4,963,165 | 10/1990 | Blume et al. | 55/16 |
| 5,040,370 | 8/1991 | Rathbone | 60/649 X |
| 5,089,033 | 2/1992 | Wijmans | 55/16 |
| 5,199,962 | 4/1993 | Wijmans | 55/16 |
| 5,205,843 | 4/1993 | Kashemekat et al. | 55/16 |
| 5,281,255 | 1/1994 | Toy et al. | 95/50 |
| 5,332,424 | 7/1994 | Rao et al. | 95/47 |
| 5,374,300 | 12/1994 | Kaschemekat et al. | 95/39 |
| 5,407,467 | 4/1995 | Lokhandwala et al. | 95/49 |
| 5,501,722 | 3/1996 | Toy et al. | 95/50 |
| 5,806,316 | 9/1998 | Avakov et al. | 60/649 |

*Primary Examiner*—Hoang Nguyen
*Attorney, Agent, or Firm*—J. Farrant

[57] ABSTRACT

A method for generating electric power, such as at, or close to, natural gas fields. The method includes conditioning natural gas containing $C_{3+}$ hydrocarbons and/or acid gas by means of a membrane separation step. This step creates a leaner, sweeter, drier gas, which is then used as combustion fuel to run a turbine, which is in turn used for power generation.

21 Claims, 8 Drawing Sheets

POWER GENERATION METHOD INCLUDING MEMBRANE SEPARATION

This invention was made in part with Government support under Contract No. DE-FG03-95ER82022 awarded by the Department of Energy. The Government has certain rights in this invention.

FIELD OF THE INVENTION

The invention relates to generation of power by means of gas-fired turbines. More particularly, the invention concerns the use of a membrane separation step to condition raw natural gas to render it suitable for use as turbine fuel, burning the fuel to power the turbine, and using the turbine to drive an electricity generator.

BACKGROUND OF THE INVENTION

Natural gas is the most important fuel gas in the United States and provides more than one-fifth of all the primary energy used in the United States. Natural gas is also used extensively as a basic raw material in the petrochemical and other chemical process industries. The composition of natural gas varies widely from field to field. For example, a raw gas stream may contain as much as 95% methane, with only minor amounts of other hydrocarbons, nitrogen, carbon dioxide, hydrogen sulfide or water vapor. On the other hand, streams that contain relatively large proportions of heavier hydrocarbons and/or other contaminants are common. Before the raw gas can be sent to the supply pipeline, it must usually be treated to remove at least one of these contaminants.

As it travels from the wellhead to the processing plant and ultimately to the supply pipeline, gas may pass through compressors or other field equipment. These units require power, and it is desirable to run them using gas engines fired by natural gas from the field. Since the gas has not yet been brought to specification, however, this practice may expose the engine to fuel that is of overly high Btu value, low octane number, or corrosive.

A related operation is to use field gas as combustion fuel for turbines, which are then used to drive other equipment, for example, electric power generators and compressors. In this case, the water and hydrocarbon dewpoints of the gas should be below the lowest temperature likely to be encountered en route to the turbine. If this is not done, the feed stream may contain entrained liquid water and hydrocarbons. These do not burn completely when introduced into the turbine firing chamber, and can lead to nozzle flow distribution problems, collection of liquid pools and other reliability issues. Additionally high concentrations of heavy hydrocarbons tend to make the fuel burn poorly, resulting in coke formation and deposition of carbon in the fuel pathways and on the turbine blades. These deposits reduce turbine performance and affect reliability.

There is a need, therefore, for a process that can be used in the field to lower to an appropriate level the dewpoint of gas destined for turbine fuel. The process should employ simple, robust equipment that can operate under field conditions without the need for sophisticated controls and frequent operator attendance or maintenance. The gas thus treated could then be used more reliably as turbine fuel.

That membranes can separate $C_{3+}$ hydrocarbons from gas mixtures, such as natural gas, is known, for example from U.S. Pat. Nos. 4,857,078, 5,281,255 and 5,501,722. Separation of acid gases from other gases is taught, for example, in U.S. Pat. No. 4,963,165. It has also been recognized that compression/condensation and membrane separation may be combined, as is shown in U.S. Pat. Nos. 5,089,033; 5,199,962; 5,205,843 and 5,374,300.

The problem of upgrading raw gas in the field, such as to sweeten sour gas, is addressed specifically in U.S. Pat. No. 4,370,150, to Fenstermaker. In this patent, Fenstermaker teaches a process that uses a membrane, selective for hydrogen sulfide and/or heavier hydrocarbons over methane, to treat a side stream of raw gas. The process produces a membrane residue stream of quality appropriate for engine fuel. The contaminants pass preferentially through the membrane to form a low-pressure permeate stream, which is returned to the main gas line upstream of the field compressor.

U.S. Pat. No. 6,053,965, relates to the use of a separation membrane in conjunction with cooling to achieve upgrading of raw natural gas to run field engines.

U.S. Pat. No. 6,035,641, relates to the use of a membrane to upgrade gas containing large amounts of nitrogen, followed by use of that gas as combustion fuel for a turbine that generates electric power.

SUMMARY OF THE INVENTION

The invention is a method for generating electric power. The invention is particularly useful in generation of electric power on-site at, or close to, a gas field. Advances in gas turbine technology, such as combined cycle processes and development of mini-turbines, are beginning to make such electric power generation attractive. Under some conditions, the economics of using the gas directly to make electricity are more favorable than piping the gas itself to distant locations. Not only is electric power useful to a wider base of industries than natural gas, but the costs of electricity transmission across long distances are usually significantly lower than the corresponding gas transport costs.

The method of the invention includes conditioning natural gas containing $C_{3+}$ hydrocarbons and/or acid gas by means of a membrane separation step, so that the gas can be used as combustion fuel to run a turbine, which is then used for power generation. The membrane separation step can be used to provide some dewpoint control and/or sweetening of the raw gas, thereby rendering it suitable for turbine fuel. The process is carried out using at least part of a natural gas stream that is at high pressure, commonly, although not necessarily, after it has passed through a compressor.

In a basic embodiment, the present invention comprises:
(a) performing a membrane separation step, comprising:
  (i) providing a membrane having a feed side and a permeate side and being selective for $C_{3+}$ hydrocarbons over methane;
  (ii) passing a high-pressure gas stream comprising $C_{3+}$ hydrocarbons and methane across the feed side of the membrane;
  (iii) withdrawing from the feed side a residue stream depleted in $C_{3+}$ hydrocarbons and enriched in methane compared with the gas stream;
  (iv) withdrawing from the permeate side a permeate stream enriched in $C_{3+}$ hydrocarbons and depleted in methane compared with the gas stream;
(b) using at least a portion of the residue stream as combustion fuel in a turbine;
(c) using the turbine to drive an electric power generator.

The method removes $C_{3+}$ hydrocarbons and/or acid gas from the raw gas. The methane-enriched residue stream is used to provide all or part of the combustion fuel for a turbine. The shaft power provided by the turbine is used at least in part to power an electric generator.

The method of the invention can be carried out with several types of membranes. The first is rubbery membranes. The second is membranes made from the so-called "super-glassy" polymers, defined and described in the Detailed Description of the Invention below, that exhibit anomalous behavior for glassy materials in that they preferentially permeate larger, more condensable molecules over smaller, less condensable molecules. A third alternative is inorganic membranes, such as microporous carbon or ceramic membranes.

The $C_{3+}$ hydrocarbons/methane membrane separation step may be carried out in one or multiple membrane stages.

Turbine fuel frequently, although not necessarily, enters the combustion chamber of the turbine at a pressure of about 150–350 psia. Commonly, therefore, the gas must be compressed in one or multiple compression stages as it passes to the turbine. In this situation, the membrane separation step can be incorporated conveniently to follow the compression stages, and the invention then includes the following steps:

(a) compressing and then cooling a gas stream comprising $C_{3+}$ hydrocarbons and methane, resulting in the formation of a high-pressure gas stream depleted in $C_{3+}$ hydrocarbons and a liquid condensate enriched in $C_{3+}$ hydrocarbons;

(b) performing a membrane separation step, comprising:
  (i) providing a membrane having a feed side and a permeate side and being selective for $C_{3+}$ hydrocarbons over methane;
  (ii) passing the high-pressure gas stream across the feed side of the membrane;
  (iii) withdrawing from the feed side a residue stream depleted in $C_{3+}$ hydrocarbons and enriched in methane compared with the gas stream;
  (iv) withdrawing from the permeate side a permeate stream enriched in $C_{3+}$ hydrocarbons and depleted in methane compared with the gas stream;

(c) using at least a portion of the residue stream as combustion fuel in a turbine;

(d) using the turbine to drive an electric power generator.

The compression step is typically carried out using a fixed speed compressor or compressors, including a return loop for passing gas back from the exhaust to the inlet side of the compressor train to accommodate fluctuations in gas flow. Optionally, the membrane separation unit may be positioned so that the permeate stream forms a return line to the compressor inlet. This increases the amount of hydrocarbon liquids recovered in the aftercooler section of the compressor.

Gas streams to be treated by and used in the method of the invention may, and frequently do, include multiple contaminants, such as $C_{3+}$ hydrocarbons, hydrogen sulfide and water. Since the membranes used in the invention are selectively permeable not only to $C_{3+}$ hydrocarbons, but also to hydrogen sulfide and water vapor, the membrane residue stream exiting the membrane separation step is leaner, sweeter and drier than the membrane feed stream. This leaner, sweeter, drier stream is usually suitable to be fed directly to the combustor without any additional treatment.

The membrane separation step of the invention is essentially passive, and in many cases can be incorporated into the power generation train without requiring any additional rotating equipment beyond what would already be provided in a prior art compressor/turbine/generator configuration.

In summary, the invention provides the following benefits:

1. Enables turbines to be run using otherwise sub-quality gas.
2. Avoids damage to turbines by out-of-spec gas.
3. Can produce additional NGL for sale if desired.

It is to be understood that the above summary and the following detailed description are intended to explain and illustrate the invention without restricting its scope.

DETAILED DESCRIPTION OF THE INVENTION

The term gas as used herein means a gas or a vapor.

The terms $C_{3+}$ hydrocarbon and heavier hydrocarbon mean a hydrocarbon having at least three carbon atoms.

The term high-pressure gas stream means a gas stream at a pressure of at least 100 psia.

The terms lighter and leaner mean reduced in $C_{3+}$ hydrocarbons content.

The term sweeter means reduced in hydrogen sulfide content.

The terms two-step and multistep as used herein mean an arrangement of membrane modules or banks of membrane modules connected together such that the residue stream from one module or bank of modules becomes the feedstream for the next.

The terms two-stage and multistage as used herein mean an arrangement of membrane modules or banks of membrane modules connected together such that the permeate stream from one module or bank of modules becomes the feedstream for the next.

The term membrane array means a set of membrane modules or banks of modules connected in multistep arrangement, multistage arrangement, or mixtures or combinations of these.

The term product residue stream means the residue stream exiting a membrane array when the membrane separation process is complete. This stream may be derived from one membrane bank, or may be the pooled residue streams from several membrane banks.

The term product permeate stream means the permeate stream exiting a membrane array when the membrane separation process is complete. This stream may be derived from one membrane bank, or may be the pooled permeate streams from several membrane banks.

Percentages herein are by volume unless otherwise stated.

The invention is an improved method for generating electric power. The method includes conditioning natural gas containing $C_{3+}$ hydrocarbons and/or acid gas by means of a membrane separation step, so that the gas can be used as combustion fuel to run a turbine, which is then used for power generation.

A feature of modern turbines is that they can deliver electricity at high efficiency, while utilizing fuel gas that is not of pipeline quality composition, such as in regard to water content, hydrocarbon dewpoint and so on. For example, pipeline specification is typically no more than 4 ppm hydrogen sulfide, no more than 1–3% carbon dioxide, no more than about 140 ppm water vapor, and a hydrocarbon dewpoint below 0° C. at 1,000 psia, which translates roughly to a total $C_{3+}$ hydrocarbon content of no more than about 5%, of which no more than about 1–2% is $C_{4+}$ hydrocarbons. In contrast, a turbine may be able to operate satisfactorily on a gas that contains, for example, as much as 1,000 ppm of hydrogen sulfide and/or 10% total $C_{3+}$ hydrocarbons or more.

For turbines, the most important issue is to reduce the water and hydrocarbon dewpoints below the lowest temperature likely to be encountered en route to the turbine. Depending on the environment of use, this generally means water and hydrocarbon dewpoints below about 25° C. at 300 psia, but can mean a much lower dewpoint, such as below 0° C. at 300 psia. It is also desirable to remove benzene and other aromatic compounds that are typically present in raw gas at the level of about 1,000 ppm, since these compounds contribute disproportionately to carbon deposition on turbine component surfaces.

Although these requirements are less demanding than typical pipeline specifications, many or most raw gas streams do not meet them. The streams that may be treated by the process of the invention are diverse and include, without limitation, those that contain excess $C_{3+}$ hydrocarbons, large amounts of acid gases, specifically hydrogen sulfide and/or carbon dioxide, and/or large amounts of water vapor. The methane content of the raw gas may be any value, but commonly will be in the range 50–99% methane, and most typically will be in the range 60–95% methane.

Figure 1:
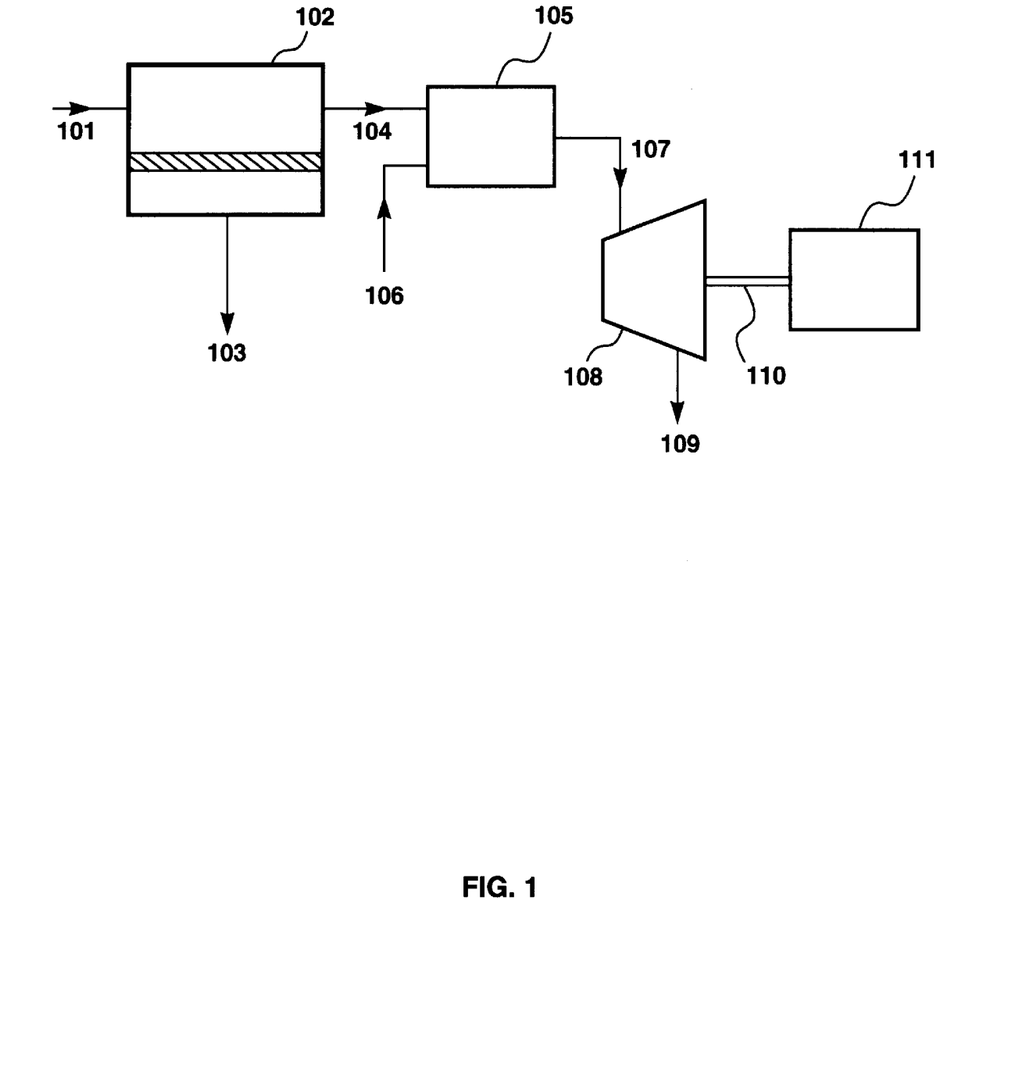
FIG. 1 is a schematic drawing of a basic embodiment of the invention.

The invention in its most basic form is shown schematically in FIG. 1. Except as explicitly set forth otherwise, all of the considerations and preferences expressed above with respect to FIG. 1 apply also to the embodiments of the other figures. Referring now to FIG. 1, stream 101 is the stream to be treated by and then used in the method of the invention. The first step or steps of the invention involves removing contaminants from raw gas to meet engine or turbine fuel specification by passing a stream of the raw gas across a contaminant-selective membrane. For the process to provide a useful separation between the $C_{3+}$ hydrocarbons and methane or between the acid gas components and methane, the pressure of stream 101 should be at least about 100 psia. If the raw gas is not at a sufficiently high pressure to provide adequate transmembrane driving force, it may be compressed before passing to the membrane separation step as described for other embodiments below.

Gas stream 101 passes to the membrane separation unit 102. This unit contains a membrane that is selective for $C_{3+}$ hydrocarbons over methane. To provide such selectivity, the membrane is preferably made from an elastomeric or rubbery polymer. Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters. Silicone rubber is the most preferred material for separating $C_{3+}$ hydrocarbons from methane. Another type of preferred membrane, if the contaminant of primary concern is hydrogen sulfide, is one in which the selective layer is a polyamide-polyether block copolymer having the general formula where PA is a polyamide segment, PE is a polyether segment and n is a positive integer. Such polymers are available commercially as Pebax® (Atochem Inc., Glen Rock, N.J.) or as Vestamid® (Nuodex Inc., Piscataway, N.J.). These types of materials are described in detail in U.S. Pat. No. 4,963,165, and their use in treating gas streams laden with acid gases is described, for example, in U.S. Pat. No. 5,407,467. These materials also exhibit selectivity in favor of $C_{3+}$, hydrocarbons over methane, but are generally slightly less selective in that regard than silicone rubber.

Alternatively, the membrane can be made from a super-glassy polymer. Super-glassy polymers have a rigid structure, high glass transition temperatures, typically above 100° C., 200° C. or higher, and have unusually high free volume within the polymer material. These materials have been found to exhibit anomalous behavior for glassy polymers, in that they preferentially permeate larger, more condensable, organic molecules over smaller inorganic or less condensable organic molecules. The best known super-glassy polymer is poly(trimethylsilylpropyne) [PTMSP], the use of which to preferentially separate condensable components from lower-boiling, less condensable components is described in U.S. Pat. No. 5,281,255, for example. This type of membrane would be useful in the present invention as an organic-component selective membrane.

Yet another alternative is to use finely microporous inorganic membranes, such as the adsorbent carbon membranes described in U.S. Pat. No. 5,332,424, the pyrolysed carbon membranes described in U.S. Pat. No. 4,685,940, or certain ceramic membranes. These membranes are, in general, more difficult to make and less readily available than polymeric membranes, and are less preferred, although they may be useful in some circumstances.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If super-glassy membranes are used, they may be formed as integral asymmetric or composite membranes.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules is the most preferred choice.

Membrane unit 102 may contain a single membrane module or bank of membrane modules or an array of modules. A single-stage membrane separation operation is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

In cases where substantial amounts of both $C_{3+}$ hydrocarbons and hydrogen sulfide must be removed, an optional configuration is two-step, with one bank of membrane modules containing silicone rubber membranes for better $C_{3+}$ hydrocarbon removal and the other bank containing polyamide-polyether block copolymer membranes for better hydrogen sulfide removal.

High-pressure stream 101 flows across the membrane surface. The permeate side of the membrane is maintained at lower pressure to provide a driving force for transmembrane permeation. $C_{3+}$ hydrocarbons, including benzene and other aromatics, if present, acid gases and water vapor all permeate the membrane preferentially, resulting in contaminant-enriched permeate stream 103 and contaminant-depleted residue stream 104.

As is familiar to those of skill in the art, the separation performance achieved by the membrane depends on such factors as the membrane selectivity, the pressure ratio between feed and permeate sides, and the membrane area. The transmembrane flux depends on the permeability of the membrane material, the pressure difference across the membrane and the membrane thickness.

One particular advantage is the ability of the membranes to operate in the presence of high concentrations of water and hydrocarbons. Water is always present in raw natural gas streams to some extent, as vapor, entrained liquid, or both. The presence of this water has little or no adverse effects on the types of membranes used in the invention, but will simply permeate the membrane along with the higher hydrocarbons. Even if the membrane separation is performed at close to the dew point for these components, any condensation of liquid will not damage the membrane.

Stream 103 is withdrawn from the membrane permeate side and may be directed to any appropriate destination, such as mixing with any other stream of similar pressure or composition that is available, or may be further processed or disposed of as a discrete stream.

The second step in the method of the invention is to use the treated gas as fuel for a turbine that delivers mechanical power. The fuel gas may be passed directly from the membrane unit to the combustor of the turbine, as indicated in FIG. 1, or may be subjected to temperature, pressure or further composition adjustment as required. Whether indirectly or directly, stream 104 passes into the fuel inlet line of combustor 105. Air stream 106 also passes into the combustor. Optionally stream 106 may be compressed using shaft power generated by the turbine, as illustrated with respect to FIG. 4, below. Hot gas 107 from the combustor is used to drive turbine 108 and exits as exhaust stream 109.

Turbine 108 may be of any convenient type. Most types of turbines known in the art can be used in the method of the invention, including, but not limited to, single-shaft and split-shaft turbines, single-stage and multi-stage turbines, and turbines employing simple open cycle, regenerated Brayton cycle, combined cycle and other configurations. The design and operation of such turbines is well known in the art. As discussed in more detail below with respect to FIG. 4, it is most preferred to use a combined cycle arrangement, in which the hot exhaust gas from the primary turbine is used to generate steam, which can then be used to generate additional power by expansion through a steam turbine. This tends to provide higher overall thermal efficiency than other turbine configurations.

The third step in the process is electric power generation. Shaft power developed by the turbine is deployed through shaft 110 to drive electricity generator 111. The generator may be of any type, but is typically a three-phase synchronous generator, as is well known in the art. The power generated may be used on-site, or may be fed to a power grid.

Typical on-site power generation and cogeneration facilities can produce between 1 and 500 MW of power, with most installations in the 10–100 MW range. At an energy conversion efficiency of 50%, the natural gas volumes required to produce this amount of power are between 2 and 20 MMscfd. Streams of this size are well suited for treatment by membrane separation. For example, assuming that the membrane has a propane/methane selectivity of at least about 3 or above, a stream of 5–10 MMscfd can typically be processed using a membrane area of about 500–800 m$^2$ of membrane, housed in 20–40 membrane modules.

Electric power produced by the method of the invention can be used for a diversity of power needs at remote sites. Representative uses include, but are not limited to, running of manufacturing or processing facilities for agricultural crops, for example sugar mills, or other raw materials. As yet another example, cogeneration is used to provide a very economical source of power and heat for some cities. The power is sold to the grid and the waste heat from the generators is used for building heating.

Figure 4:
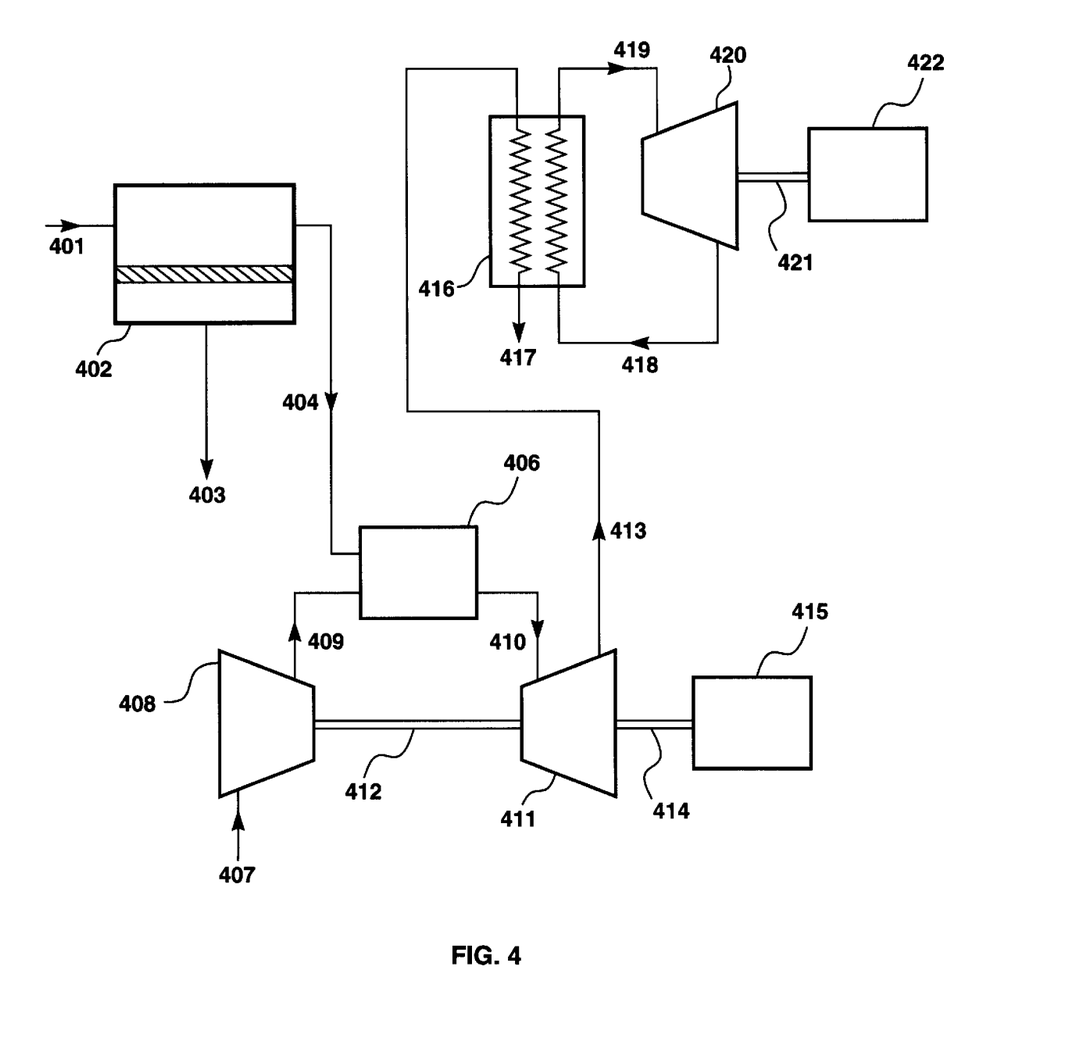
FIG. 4 is a schematic drawing of an embodiment of the invention in which additional power is generated by a steam turbine.

An embodiment using a combined cycle turbine configuration is shown in FIG. 4. Referring to this figure, feed stream 401 passes to membrane separation step or unit 402. Here the stream is divided into residue stream 404, enriched in methane and depleted in $C_{3+}$ hydrocarbons compared with stream 401, and permeate stream 403, enriched in $C_{3+}$ hydrocarbons and depleted in methane compared with stream 401. Stream 403 may be subjected to further treatment, mixed with other gases to form a fuel supply for use elsewhere in the plant, or sent to any other desired destination. Stream 404 passes into the fuel inlet line of combustor 406. This figure includes the option to use the primary turbine to drive the compressor that compresses incoming combustion air. Air stream 407 passes through compressor 408 and passes as compressed air stream 409 to the combustor. Hot gas 410 from the combustor is used to drive primary turbine 411 and exits as exhaust stream 413. Shaft power developed by the turbine is deployed through shaft 412 to drive compressor 408 and through shaft 414 to drive electricity generator 415. The hot exhaust gas stream 413 from the primary turbine enters steam generator 416, which will typically contain economizer, evaporator and superheater heat exchange zones. The cooled exhaust gas exits the process or apparatus as stream 417. Steam produced in the steam generator enters steam turbine 420 as stream 419. The steam turbine may also be of any convenient design and type, such as single-stage or multi-stage, Rateau or Curtis design, condensing or non-condensing, extraction or admission, and impulse or reaction. FIG. 4 shows a closed Rankine cycle, in which the exhaust steam exits as stream 418 and is condensed and pumped back to the steam generator by a condenser and pump (not shown for simplicity). Shaft power developed by the steam turbine is deployed through shaft 421 to drive an additional electricity generator 422.

Figure 2:
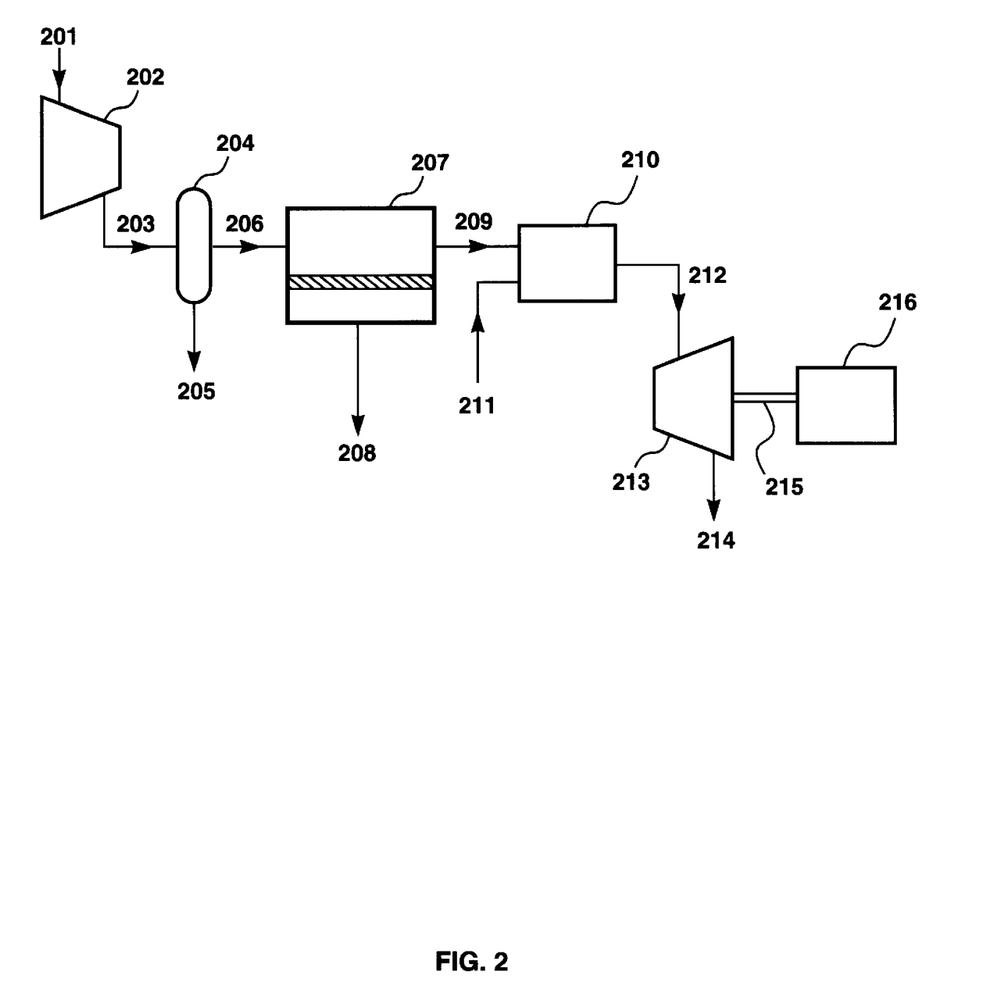
FIG. 2 is a schematic drawing of an alternative embodiment of the invention.

A preferred embodiment of the invention for use in situations in which the incoming raw gas must be compressed is shown in FIG. 2. Referring to this figure, raw gas stream 201 is passed into compressor 202, where it is compressed to any desired pressure. The compression step is generally, although not necessarily, carried out using a fixed speed compressor or compressors. Such compressors include a loop, not shown, for passing gas back from the exhaust to the inlet side of the compressor train to accommodate fluctuations in gas flow. Typically the preferred pressure to which the gas should be compressed is in the range 150–350 psia. Compression may be carried out in a single stage or in multiple stages. As just two examples, raw gas at a pressure of about 50 psia might be raised in pressure through two stages to 200 psia, or raw gas at 30 psia might be raised in pressure through three stages to 350 psia.

Compressed stream 203 passes to aftercooler/separator section 204, resulting in the formation of liquid hydrocarbon stream 205, which is withdrawn and sent to any desired destination or treatment. In some areas of the country and the world, natural gas liquids (NGL), such as those recovered in stream 205, represent a useful additional by-product of the method of the invention, either because the NGL has value in its own right, or as a feedstock for production of other petrochemicals, for example.

Remaining gas stream 206 passes to the membrane separation unit 207. $C_{3+}$ hydrocarbons, acid gases and water vapor permeate the membrane preferentially, to form $C_{3+}$ hydrocarbon-enriched permeate stream 208, which is withdrawn and sent to any desired destination or treatment, and leaner, sweeter, drier residue stream 209. Stream 209 passes into combustor 210, and air is introduced as stream 211. Combustion exhaust hot gas stream 212 passes to turbine 213 and exits as exhaust stream 214. Shaft power developed by the turbine is deployed through shaft 215 to drive electricity generator 216. As was discussed above, any type of turbine may be used, and preferred configurations involve the use of combined cycle turbines.

Figure 5:
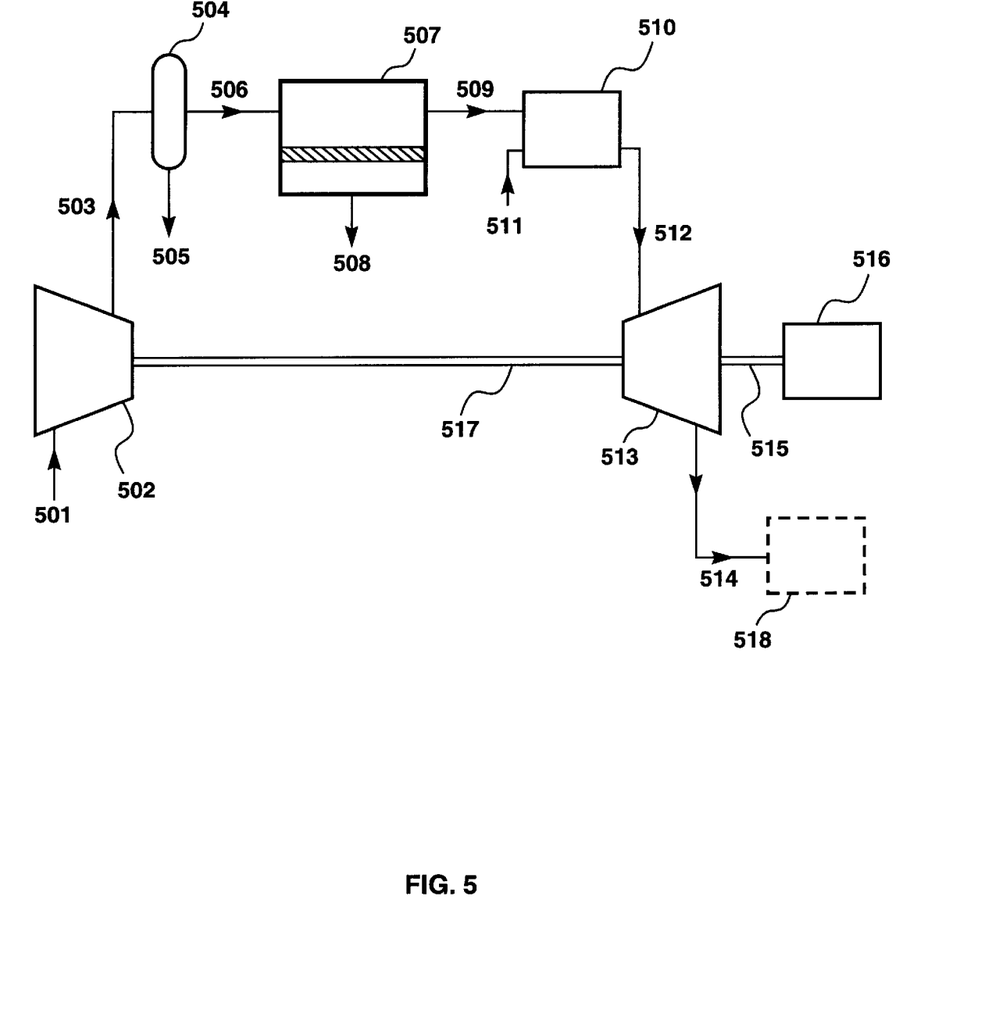
FIG. 5 is a schematic drawing of an embodiment of the invention in which power for compression of the raw gas is provided by a turbine.

An embodiment using a compressor to raise the raw gas pressure and a combined cycle turbine is shown in FIG. 5, which also includes the option to drive the compressor from the primary turbine. Referring to this figure, raw gas stream 501 is passed into compressor 502. Compressed stream 503 passes to aftercooler/separator section 504, resulting in the formation of liquid hydrocarbon stream 505 and gas stream 506, which passes to the membrane separation unit 507. $C_{3+}$ hydrocarbons, acid gases and water vapor permeate the membrane preferentially, to form $C_{3+}$ hydrocarbon-enriched permeate stream 508, which is withdrawn, and residue stream 509. Stream 509 passes into combustor 510, and air is introduced as stream 511. Hot gas stream 512 passes to turbine 513 and exits as exhaust stream 514. Stream 514 is then used to produce steam to drive the steam turbine, which in turn produces electric power. The steam generation/power production train, indicated simply as box 518, is typically configured as shown in FIG. 4, having steam generator, steam turbine and electricity generator sections. Power developed by primary turbine 513 is made use of through shaft 517 to drive compressor 502. Optionally, as shown, the primary turbine 513 may also be used for electric power generation in generator 516 through shaft 515.

Figure 3:
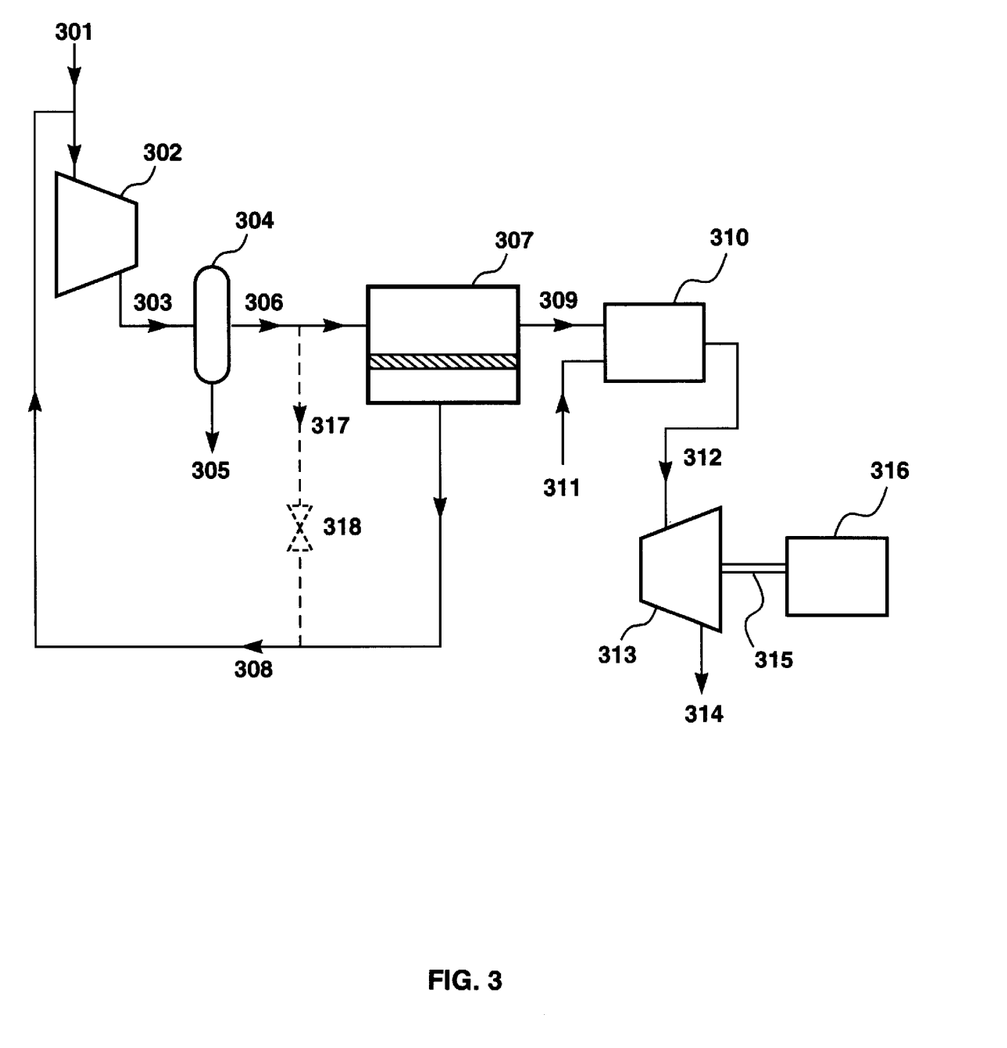
FIG. 3 is a schematic drawing of an embodiment of the invention in which the permeate stream is returned to the inlet side of the compressor.

In one aspect, the invention provides a simple, reliable method to generate electric power. In another aspect, the invention provides a way to generate additional amounts of natural gas liquids (NGL), which, as was mentioned with respect to FIG. 2, is a valuable by-product of the invention. FIG. 3 shows an embodiment that can be used to increase NGL production. Referring to this figure, raw gas stream 301 is passed into compressor 302, where it is compressed to any desired pressure. Compressed stream 303 passes to aftercooler/separator section 304, resulting in the formation of NGL stream 305. Gas stream 306 passes to the membrane separation unit 307, where it is split into residue stream 309, enriched in methane and depleted in $C_{3+}$ hydrocarbons, and permeate stream 308, enriched in $C_{3+}$ hydrocarbons and depleted in methane. Stream 309 passes into combustor 310, and air is introduced as stream 311. Combustion exhaust hot gas stream 312 passes to turbine 313 and exits as exhaust stream 314. Shaft power developed by the turbine is deployed through shaft 315 to drive electricity generator 316.

In this embodiment, permeate stream 308 is recirculated to the inlet side of the compressor train, as shown. Typically, stream 308 can contain as much as 30 vol % or more of $C_{3+}$ hydrocarbons, and the recirculation of this rich stream can increase the production of NGL, compared with an embodiment of the type of FIG. 2, by as much as 10 wt %, 15 wt % or more.

In configurations that include recirculation of the membrane permeate stream, it will be apparent to those of skill in the art that recirculation line 308 may supplement or replace the conventional compressor return gas line. FIG. 3 indicates these two options. In the event that the permeate return line replaces the conventional compressor return line, line 317 is absent and the membrane unit essentially forms the splitting point between recirculated and onward-moving gas. In this aspect, the membrane unit can be viewed as providing selective gas recirculation. The maximum volume flow of permeate stream 308 can be controlled to match the return gas capacity required to meet compressor specification, but the gas will be heavier in proportion to the $C_{3+}$ hydrocarbons enrichment than would be the case for the same volume flow absent the membrane unit.

In the event that the permeate stream supplements the conventional gas return, line 317 is present and provides for partial direct recirculation, after pressure reduction through valve 318, of sufficient gas to meet compressor specification.

The invention is now further illustrated by the following examples, which are intended to be illustrative of the best mode of carrying out the invention, but are not intended to limit the scope or underlying principles of the invention in any way.

EXAMPLE 1

Not in Accordance with the Invention

A computer calculation was performed with a modeling program, ChemCad III (ChemStations, Inc., Houston, Tex.), to illustrate a multi-stage compression/condensation operation for recovering NGL and upgrading a raw gas stream, prior to passing the stream as fuel gas to a turbine (not shown in this figure), and using the shaft power to drive an electricity generator.

The feed mixture was chosen to approximate a raw gas stream, and was assumed to contain the following components in the concentrations noted:

| | |
|---|---|
| 0.09% | Nitrogen |
| 0.76% | Carbon Dioxide |
| 58.93% | Methane |
| 14.22% | Ethane |
| 12.47% | Propane |
| 7.57% | Butanes |
| 2.32% | Pentanes |
| 0.85% | N-Hexane |
| 0.76% | N-Heptane |
| 0.19% | N-Octane |
| 1.83% | Water |

Figure 6:
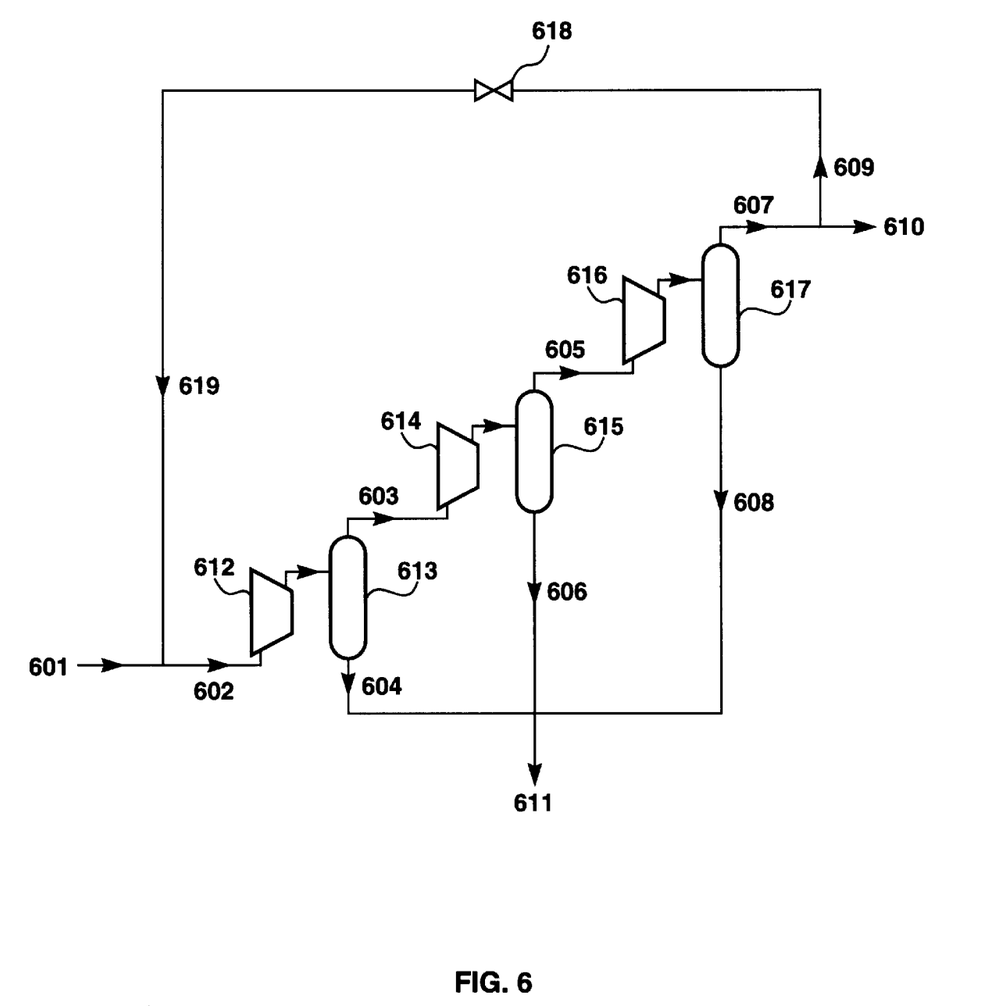
FIG. 6 is a schematic drawing of three-stage compression, not in accordance with the invention.

We assumed a three-stage compression/condensation operation to raise the pressure from 35 psia to 300 psia, as shown in FIG. 6. In this Figure, raw gas stream 601 is combined with compressor loop return stream 619 to form combined stream 602. This stream is compressed and cooled sequentially in three steps in compressors, 612, 614, and 616, and aftercooler/separator sections 613, 615, and 617. The condensed liquids from lines 604, 606, and 608 are combined to produce NGL stream 611. Uncondensed overhead streams 603 and 605 form the feeds to the subsequent compressors. The third uncondensed overhead stream, 607, is divided into stream 610, which is used for turbine fuel gas, and stream 609. Stream 609 is reduced in pressure by passing through valve 618. Stream 619 is the low pressure compressor loop return stream.

The results of the calculations are shown in Table 1. The stream numbers correspond to FIG. 6.

The result of the compression/cooling is to produce about 3,600 lb/h of liquid hydrocarbons from the phase separators as stream 611. As a result, the methane content of the turbine fuel gas, stream 610, has been increased from approximately 59% to approximately 64%.

EXAMPLE 2

Turbine Fuel Gas Upgrading According to the Method of the Invention

A computer calculation was performed with a modeling program, ChemCad III (ChemStations, Inc., Houston, Tex.), to illustrate the improvements in NGL recovery and fuel gas quality that can be obtained by including a membrane separation step in the electric power generation train. We assumed that the treatment operation was as shown in FIG. 7, which is similar to the multi-stage compression/ condensation design of FIG. 6, with the addition of a membrane separation unit to treat the compressed gas before it is passed to the turbine.

Figure 7:
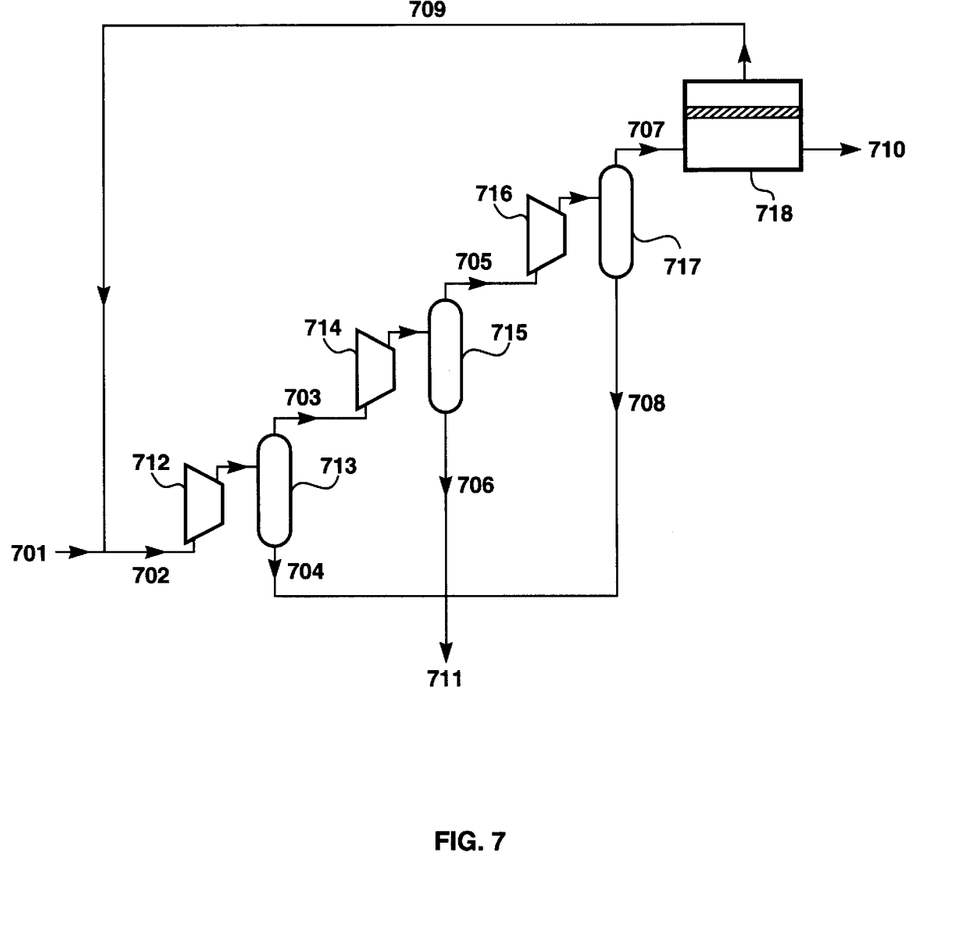
FIG. 7 is a schematic drawing of a preferred embodiment in which the membrane separation step forms part of the compressor return loop.

In FIG. 7, raw gas stream 701 is combined with compressor loop return stream 709 to form combined stream 702. This stream is compressed and cooled sequentially in three steps in compressors, 712, 714, and 716, and aftercooler/separator sections 713, 715, and 717. The condensed liquids from lines 704, 706, and 708 are combined to produce NGL stream 711. Uncondensed overhead streams 703 and 705 form the feeds to the subsequent compressors. The third uncondensed overhead stream, 707, forms the feed stream to the membrane unit, 718, which was assumed to contain silicone rubber membranes. The heavier hydrocarbons permeate the membrane and, as compressor loop return stream 709, are passed to the front of the process for additional NGL recovery. Methane-enriched residue stream 710 is passed to the combustion zone of the turbine.

The feed mixture was assumed to be as in Example 1. The results of the calculations are shown in Table 2. The stream numbers correspond to FIG. 7.

TABLE 1

| Component/<br>Parameter | Stream<br>601 | Stream<br>619 | Stream<br>602 | Stream<br>607 | Stream<br>611 | Stream<br>609 | Stream<br>610 |
|---|---|---|---|---|---|---|---|
| Flow Rate (lbmol/h) | 749 | 651 | 1,400 | 1,332 | 68.09 | 651 | 681 |
| Mass Flow (lb/h) | 20,760 | 16,433 | 37,193 | 33,620 | 3,573 | 16,433 | 17,187 |
| Temperature (° C.) | 31 | 11 | 22 | 27 | 12 | 27 | 27 |
| Pressure (psia) | 35 | 35 | 35 | 300 | 65 | 300 | 300 |
| Component (mol %) | | | | | | | |
| Nitrogen | 0.09 | 0.10 | 0.10 | 0.10 | — | 0.10 | 0.10 |
| Carbon Dioxide | 0.76 | 0.82 | 0.79 | 0.82 | 0.17 | 0.82 | 0.82 |
| Methane | 58.93 | 64.24 | 61.40 | 64.24 | 5.85 | 64.24 | 64.24 |
| Ethane | 14.22 | 14.98 | 14.58 | 14.98 | 6.62 | 14.98 | 14.98 |
| Propane | 12.47 | 12.09 | 12.30 | 12.09 | 16.23 | 12.09 | 12.09 |
| Butanes | 7.57 | 6.04 | 6.86 | 6.04 | 22.85 | 6.04 | 6.04 |
| Pentanes | 2.32 | 1.29 | 1.84 | 1.29 | 12.66 | 1.29 | 1.29 |
| N-Hexane | 0.85 | 0.19 | 0.54 | 0.19 | 7.53 | 0.19 | 0.19 |
| N-Heptane | 0.76 | 0.06 | 0.43 | 0.06 | 7.75 | 0.06 | 0.06 |
| N-Octane | 0.19 | — | 0.10 | — | 2.05 | — | — |
| Water | 1.83 | 0.18 | 1.06 | 0.18 | 18.28 | 0.18 | 0.18 |

— = less than 0.01
Theoretical horsepower = 463 + 409 + 576

TABLE 2

| Component/Parameter | Stream 701 | Stream 709 | Stream 702 | Stream 707 | Stream 711 | Stream 710 |
|---|---|---|---|---|---|---|
| Flow Rate (lbmol/h) | 749 | 652 | 1,401 | 1,262 | 140 | 610 |
| Mass Flow (lb/h) | 20,760 | 20,939 | 41,702 | 34,664 | 7,037 | 13,726 |
| Temperature (° C.) | 31 | 15 | 23 | 27 | 5 | 15 |
| Pressure (psia) | 35 | 35 | 35 | 300 | 65 | 290 |
| Component (mol %) | | | | | | |
| Nitrogen | 0.09 | 0.02 | 0.06 | 0.07 | — | 0.12 |
| Carbon Dioxide | 0.76 | 1.09 | 0.91 | 0.99 | 0.22 | 0.88 |
| Methane | 58.93 | 37.81 | 49.10 | 53.89 | 5.88 | 71.08 |
| Ethane | 14.22 | 23.67 | 18.62 | 19.59 | 9.83 | 15.24 |
| Propane | 12.47 | 24.64 | 18.14 | 17.28 | 25.87 | 9.41 |
| Butanes | 7.57 | 10.51 | 8.94 | 6.83 | 27.96 | 2.89 |
| Pentanes | 2.32 | 1.69 | 2.03 | 1.04 | 10.94 | 0.35 |
| N-Hexane | 0.85 | 0.17 | 0.54 | 0.10 | 4.48 | 0.02 |
| N-Heptane | 0.76 | 0.05 | 0.43 | 0.03 | 4.05 | 0.05 |
| N-Octane | 0.19 | — | 0.10 | — | 1.02 | — |
| Water | 1.83 | 0.34 | 1.14 | 0.18 | 9.76 | 0.01 |

— = less than 0.01
membrane area = 680 m²
Theoretical horsepower = 460 + 403 + 560

By including a membrane separation unit in the power generation train, the recovery of NGL has nearly doubled, to over 7,000 lb/h, and the fuel gas has been upgraded to about 71% methane.

EXAMPLE 3

Turbine Fuel Gas Upgrading According to the Method of the Invention

A computer calculation was performed to illustrate the improvements in NGL recovery and fuel gas quality that can be obtained by including a membrane separation step in the electric power generation train. We assumed that the treatment operation was as shown in FIG. 8, which is similar to FIG. 7, except that the membrane permeate is withdrawn rather than recirculated within the process.

Figure 8:
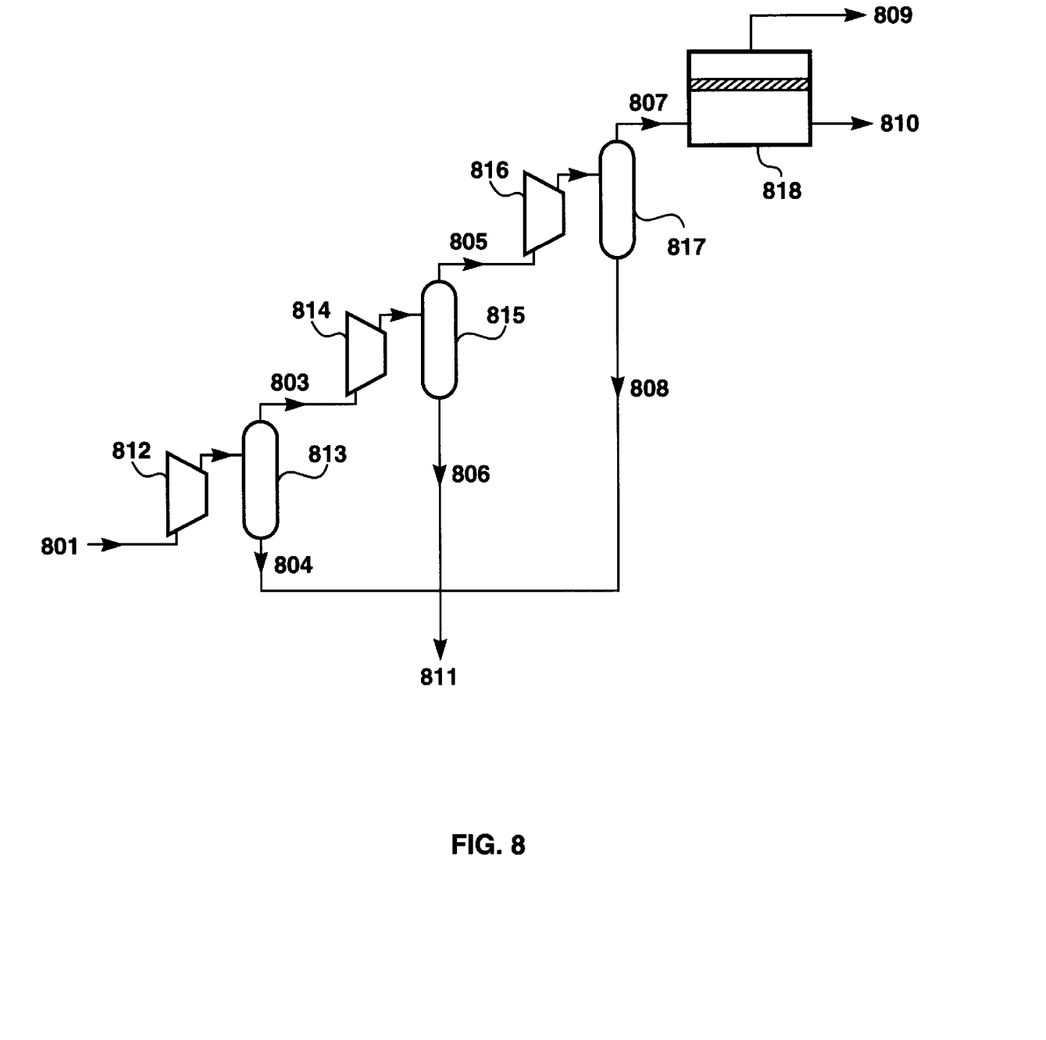
FIG. 8 is a schematic drawing of a preferred embodiment of the invention in which the permeate stream is not returned to the compression step.

In FIG. 8, raw gas stream 801 is compressed and cooled sequentially in three steps in compressors, 812, 814, and 816, and aftercooler/separator sections 813, 815, and 817. The condensed liquids from lines 804, 806, and 808 are combined to produce NGL stream 811. Uncondensed overhead streams 803 and 805 form the feeds to the subsequent compressors. The third uncondensed overhead stream, 807, forms the feed stream to the membrane unit, 818, which was assumed to contain silicone rubber membranes. The heavier hydrocarbons permeate the membrane and are passed as stream 809 to any desired destination. Methane-enriched residue stream 810 is passed to the combustion zone of the turbine.

Due to the absence of a compressor loop return stream, some components of the raw gas stream were assumed to be in slightly different concentrations than in Examples 1 and 2.

The results of the calculations are shown in Table 3. The stream numbers correspond to FIG. 8.

TABLE 3

| Component/Parameter | Stream 801 | Stream 807 | Stream 811 | Stream 809 | Stream 810 |
|---|---|---|---|---|---|
| Flow Rate (lbmol/h) | 1,400 | 1,295 | 105 | 633 | 662 |
| Mass Flow (lb/h) | 38,881 | 32,957 | 5,923 | 19,348 | 13,609 |
| Temperature (° C.) | 31 | 27 | 14 | 16 | 16 |
| Pressure (psia) | 35 | 300 | 65 | 18 | 290 |
| Component (mol %) | | | | | |
| Nitrogen | 0.10 | 0.10 | — | 0.04 | 0.17 |
| Carbon Dioxide | 0.76 | 0.81 | 0.16 | 0.96 | 0.68 |
| Methane | 59.33 | 63.69 | 5.48 | 46.65 | 79.98 |
| Ethane | 14.32 | 14.97 | 6.29 | 19.42 | 10.71 |
| Propane | 12.55 | 12.29 | 15.80 | 19.03 | 5.85 |
| Butanes | 7.62 | 6.33 | 23.54 | 10.63 | 2.22 |
| Pentanes | 2.34 | 1.39 | 14.01 | 2.47 | 0.36 |
| N-Hexane | 0.86 | 0.18 | 9.19 | 0.35 | 0.03 |
| N-Heptane | 0.76 | 0.04 | 9.66 | 0.08 | — |
| N-Octane | 0.19 | — | 2.53 | — | — |
| Water | 1.17 | 0.18 | 13.40 | 0.37 | — |

— = less than 0.01
membrane area = 680 m²
Theoretical horsepower = 475 + 405 + 566

By eliminating the permeate recycle of the heavier hydrocarbons, the recovery of NGL is reduced to approximately 5,900 lb/h, compared with 7,000 lb/h in the permeate recycle case. However, the fuel gas quality is higher, at 80% methane, compared with 71% in the recycle case.

EXAMPLE 4

Comparative Example

The NGL recovery level and the improvement in turbine fuel gas quality for the gas streams in Examples 1–3 are compared in Table 4.

TABLE 4

| | Total NGL recovery (lb/h) (Streams 611, 711,811) | Increase in NGL recovery (%) | CH₄ content in fuel gas (mol %) (Streams 610, 710,810) | Dewpoint of fuel gas (° C.) |
|---|---|---|---|---|
| Example 1 (FIG. 6) (non-membrane) | 3,573 | — | 64 | 26 |
| Example 2 (FIG. 7) (permeate recycle) | 7,037 | 96 | 71 | 0 |
| Example 3 (FIG. 8) (permeate withdrawn) | 5,923 | 65 | 80 | −8 |

As the methane content is increased and the $C_{3+}$ hydrocarbon content is decreased in the fuel gas stream (streams 610, 710, and 810), the dewpoint of the stream is lowered, reducing the potential for condensation of higher hydrocarbons in the line to the turbine section. The maximum methane content and dewpoint control is achieved with the design of FIG. 8, as in Example 3.

However, if recovery of NGL is a priority, the permeate recycle design of FIG. 7, as in Example 2, may be preferable, even though the methane content and dewpoint of the fuel gas stream may be less attractive.

EXAMPLE 5

Not in Accordance With the Invention

The calculation of Example 1 was repeated with a raw gas stream containing hydrogen sulfide. The feed mixture was assumed to contain the following components in the concentrations noted:

| | |
|---|---|
| 0.09% | Nitrogen |
| 0.76% | Carbon Dioxide |
| 58.90% | Methane |
| 14.22% | Ethane |
| 12.46% | Propane |
| 7.56% | Butanes |
| 2.32% | Pentanes |
| 0.85% | N-Hexane |
| 0.76% | N-Heptane |
| 0.19% | N-Octane |
| 1.83% | Water |
| 0.05% | Hydrogen Sulfide |

We again assumed the three-stage compression/condensation operation as in FIG. 6. The results of the calculations are shown in Table 5. The stream numbers correspond to FIG. 6.

TABLE 5

| Component/Parameter | Stream 601 | Stream 619 | Stream 602 | Stream 607 | Stream 611 | Stream 609 | Stream 610 |
|---|---|---|---|---|---|---|---|
| Flow Rate (lbmol/h) | 749 | 651 | 1,401 | 1,333 | 68.1 | 651 | 681 |
| Mass Flow (lb/h) | 20,762 | 16,435 | 37,197 | 33,626 | 3,570 | 16,435 | 17,191 |
| Temperature (° C.) | 31 | 11 | 22 | 27 | 12 | 27 | 27 |
| Pressure (psia) | 35 | 35 | 35 | 300 | 65 | 300 | 300 |
| Component (mol %) | | | | | | | |
| Nitrogen | 0.09 | 0.10 | 0.10 | 0.10 | — | 0.10 | 0.10 |
| Carbon Dioxide | 0.76 | 0.82 | 0.79 | 0.82 | 0.17 | 0.82 | 0.82 |
| Methane | 58.90 | 64.21 | 61.38 | 64.21 | 5.85 | 64.21 | 64.21 |
| Ethane | 14.22 | 14.98 | 14.57 | 14.98 | 6.62 | 14.98 | 14.98 |
| Propane | 12.46 | 12.09 | 12.29 | 12.09 | 16.22 | 12.09 | 12.09 |
| Butanes | 7.56 | 6.03 | 6.85 | 6.03 | 22.84 | 6.03 | 6.03 |
| Pentanes | 2.32 | 1.29 | 1.84 | 1.29 | 12.64 | 1.29 | 1.29 |
| N-Hexane | 0.85 | 0.19 | 0.54 | 0.19 | 7.53 | 0.19 | 0.19 |
| N-Heptane | 0.76 | 0.06 | 0.43 | 0.06 | 7.75 | 0.06 | 0.06 |
| N-Octane | 0.19 | — | 0.10 | — | 2.05 | — | — |
| Water | 1.83 | 0.18 | 1.06 | 0.18 | 18.29 | 0.18 | 0.18 |
| Hydrogen Sulfide | 0.05 | 0.04 | 0.04 | 0.04 | 0.02 | 0.04 | 0.04 |

— = less than 0.01
Theoretical horsepower = 463 + 409 + 576

As in Example 1, the compression/cooling produced about 3,600 lb/h of liquid hydrocarbons, and the methane content of the turbine fuel gas, stream 610, was increased to approximately 64%.

The hydrogen sulfide content in the fuel gas has been reduced slightly because some of the hydrogen sulfide has been dissolved in the higher hydrocarbons and is removed with the NGL stream, 611.

EXAMPLE 6

Turbine Fuel Gas Upgrading According to the Method of the Invention

The calculation of Example 2 was repeated with a raw gas stream containing hydrogen sulfide. The feed mixture was assumed to be as in Example 5. We again assumed the design as in FIG. 7.

The results of the calculations are shown in Table 6. The stream numbers correspond to FIG. 7.

TABLE 6

| Component/Parameter | Stream 701 | Stream 709 | Stream 702 | Stream 707 | Stream 711 | Stream 710 |
|---|---|---|---|---|---|---|
| Flow Rate | 749 | 652 | 1,401 | 1,262 | 140 | 610 |
| Mass Flow (lb/h) | 20,762 | 20,951 | 41,710 | 34,676 | 7,033 | 13,725 |
| Temperature (° C.) | 31 | 15 | 23 | 27 | 5 | 15 |
| Pressure (psia) | 35 | 35 | 35 | 300 | 65 | 290 |
| Component (mol %) | | | | | | |
| Nitrogen | 0.09 | 0.02 | 0.06 | 0.07 | — | 0.12 |
| Carbon Dioxide | 0.76 | 1.09 | 0.91 | 0.99 | 0.23 | 0.88 |
| Methane | 58.90 | 37.78 | 49.08 | 53.86 | 5.88 | 71.06 |
| Ethane | 14.22 | 23.64 | 18.60 | 19.58 | 9.82 | 15.23 |
| Propane | 12.46 | 24.61 | 18.12 | 17.27 | 25.84 | 9.40 |
| Butanes | 7.56 | 10.51 | 8.93 | 6.83 | 27.95 | 2.89 |

TABLE 6-continued

| Component/Parameter | Stream 701 | Stream 709 | Stream 702 | Stream 707 | Stream 711 | Stream 710 |
|---|---|---|---|---|---|---|
| Pentanes | 2.31 | 1.69 | 2.03 | 1.04 | 10.94 | 0.35 |
| N-Hexane | 0.85 | 0.17 | 0.54 | 0.10 | 4.48 | 0.02 |
| N-Heptane | 0.76 | 0.05 | 0.43 | 0.03 | 4.05 | |
| N-Octane | 0.19 | — | 0.10 | — | 1.02 | |
| Water | 1.83 | 0.34 | 1.14 | 0.18 | 9.76 | 0.01 |
| Hydrogen Sulfide | 0.05 | 0.09 | 0.06 | 0.06 | 0.03 | 0.03 |

— = less than 0.01
membrane area = 680 m$^2$
Theoretical horsepower = 460 + 403 + 560

As in Example 2, the NGL recovery is more than 7,000 lb/h, and the methane content of the turbine fuel gas, stream 710, has been increased to approximately 71%.

The hydrogen sulfide content in the fuel gas stream had been reduced because some of the hydrogen sulfide permeates the membrane. As the permeate is recycled to the condensation steps, a portion of the hydrogen sulfide is removed with the condensed NGL stream. However, since a silicone rubber membrane exhibits a lower selectivity to hydrogen sulfide, as the membrane permeate continues to be recycled, some of the hydrogen sulfide will remain in the fuel gas (residue) stream.

EXAMPLE 7

Turbine Fuel Gas Upgrading According to the Method of the Invention

The calculation of Example 3 was repeated with a raw gas stream containing hydrogen sulfide. Due to the absence of a compressor loop return stream, some components of the feed to the process were assumed to be in slightly different concentrations than in Examples 5 and 6. We again assumed the design as in FIG. 8.

The results of the calculations are shown in Table 7. The stream numbers correspond to FIG. 8.

TABLE 8

|  | Total NGL recovery (lb/h) (Streams, 611, 711, 811) | Increase in NGL recovery (%) | $CH_4$ content in fuel gas (mol %) (Streams 610, 710, 810) | $H_2S$ content in fuel gas (lb/h)/ (%) | $H_2S$ removal (%) | Dewpoint of fuel gas (° C.) |
|---|---|---|---|---|---|---|
| Example 5 (FIG. 6) (non-membrane) | 3,570 | — | 64 | 688 | — | 26 |
| Example 6 (FIG. 7) (permeate recycle) | 7,033 | 97 | 71 | 412 | 40 | 0 |
| Example 7 (FIG. 8) (permeate withdrawn) | 5,920 | 66 | 80 | 272 | 60 | −8 |

TABLE 7

| Component/ Parameter | Stream 801 | Stream 807 | Stream 811 | Stream 809 | Stream 810 |
|---|---|---|---|---|---|
| Flow Rate (lbmol/h) | 1,400 | 1,295 | 105 | 633 | 662 |
| Mass Flow (lb/h) | 38,885 | 32,965 | 5,920 | 19,360 | 13,605 |
| Temperature (° C.) | 31 | 27 | 14 | 16 | 16 |
| Pressure (psia) | 35 | 300 | 65 | 18 | 290 |
| Component (mol %) |  |  |  |  |  |
| Nitrogen | 0.10 | 0.10 | — | 0.04 | 0.17 |
| Carbon Dioxide | 0.76 | 0.81 | 0.16 | 0.96 | 0.68 |
| Methane | 59.30 | 63.65 | 5.48 | 46.62 | 79.96 |
| Ethane | 14.31 | 14.96 | 6.29 | 19.40 | 10.71 |
| Propane | 12.55 | 12.28 | 15.79 | 19.01 | 5.85 |
| Butanes | 7.61 | 6.33 | 23.47 | 10.62 | — |
| Pentanes | 2.33 | 1.39 | 14.00 | 2.46 | 0.36 |
| N-Hexane | 0.86 | 0.18 | 9.19 | 0.35 | 0.03 |
| N-Heptane | 0.76 | 0.04 | 9.66 | 0.08 | — |
| N-Octane | 0.19 | — | 2.53 | — | — |
| Water | 1.17 | 0.18 | 13.40 | 0.37 | — |
| Hydrogen Sulfide | 0.05 | 0.05 | 0.02 | 0.08 | 0.02 |

— = less than 0.01
membrane area = 680 m$^2$
Theoretical horsepower = 475 + 405 + 566

As in Example 3, the NGL recovery is approximately 5,900 lb/h, and the methane content of the turbine fuel gas, stream 810, has been increased to approximately 80%.

In this case, the hydrogen sulfide content in the fuel gas stream has been further reduced compared to Example 6, because the hydrogen sulfide permeating the membrane is withdrawn from the process loop, rather than recycled.

EXAMPLE 8

Comparative Example

The NGL recovery level and the improvement in turbine fuel gas quality for the gas streams in Examples 5–7 are compared in Table 8.

Using the membrane design of FIG. 8, as in Example 7, achieves the maximum methane content and dewpoint control of the turbine fuel gas stream, as well as the maximum hydrogen sulfide removal. The permeate recycle design of FIG. 7, as in Example 6, may be preferable in cases where NGL, recovery is the priority, even though the hydrogen sulfide content in the fuel gas is slightly higher than in the Example 7.

I claim:

1. A method for generating electric power, comprising the steps of:
   (a) lowering the hydrocarbon dewpoint of a high-pressure gas stream comprising $C_{3+}$ hydrocarbons and methane by removing $C_{3+}$ hydrocarbons by selective permeation of the $C_{3+}$ hydrocarbons through a membrane;
   (b) using at least a portion of a resulting hydrocarbon-dewpoint-lowered membrane residue stream as combustion fuel in a turbine;
   (c) using the turbine to drive an electric power generator.

2. The method of claim 1, wherein the high-pressure gas stream also comprises hydrogen sulfide.

3. The method of claim 1, wherein the high-pressure gas stream is created by compressing a lower-pressure gas stream.

4. The method of claim 1, further comprising cooling the high-pressure gas stream prior to hydrocarbon-dewpoint-lowering step (a).

5. The method of claim 1, wherein the high-pressure gas stream is created by compressing a lower-pressure gas stream and wherein the selective permeation of the $C_{3+}$ hydrocarbons produces a membrane permeate stream that is returned to the lower-pressure gas stream.

6. The method of claim 1, wherein the membrane is a polymeric membrane comprising silicone rubber.

7. The method of claim 1, wherein the membrane is a polymeric membrane comprising a superglassy polymer.

8. The method of claim 1, wherein the membrane is a polymeric membrane comprising a polyamide-polyether block copolymer.

9. The method of claim 1, wherein the membrane comprises a carbon membrane.

10. The method of claim 1, further comprising:

(d) using the turbine to drive a compressor.

11. The method of claim 1, wherein the high-pressure gas stream is created by compressing a lower-pressure gas stream in a compressor, and wherein a portion of the electric power generated by steps (a) through (c) is used to drive the compressor.

12. A method for generating electric power, comprising the steps of:

(a) lowering the hydrocarbon dewpoint of a gas stream comprising $C_{3+}$ hydrocarbons (i) compressing in a compressor and then cooling the gas stream, resulting in the formation of a high-pressure gas stream depleted in $C_{3+}$ hydrocarbons and a liquid condensate enriched in $C_{3+}$ hydrocarbons;

(ii) removing additional $C_{3+}$ hydrocarbons by selective permeation of the $C_{3+}$ hydrocarbons through a membrane;

(b) using at least a portion of a resulting hydrocarbon-dewpoint-lowered membrane residue stream as combustion fuel in a turbine;

(c) using the turbine to drive an electric power generator.

13. The method of claim 12, wherein the gas stream also comprises hydrogen sulfide.

14. The method of claim 12, wherein the selective permeation of the $C_{3+}$ hydrocarbons produces a membrane permeate stream that is returned to the gas stream prior to the compressing and cooling step.

15. The method of claim 12, wherein the membrane is a polymeric membrane comprising silicone rubber.

16. The method of claim 12, wherein the membrane is a polymeric membrane comprising a superglassy polymer.

17. The method of claim 12, wherein the membrane is a polymeric membrane comprising a polyamide-polyether block copolymer.

18. The method of claim 12, wherein the membrane comprises a carbon membrane.

19. The method of claim 12, further comprising:

(d) using the turbine to drive the compressor.

20. The method of claim 12, wherein a portion of the electric power generated by steps (a) through (c) is used to drive the compressor.

21. The method of claim 12, wherein at least a portion of the liquid condensate is withdrawn as an NGL product.

* * * * *